(12) United States Patent
Sweetman

(10) Patent No.: US 8,733,286 B2
(45) Date of Patent: May 27, 2014

(54) LITTER BOX WITH APPARATUS FOR CATCHING AND RETURNING TRACKED LITTER AND METHOD OF ASSEMBLING THE LITTER BOX

(76) Inventor: Robert Sweetman, Staten Island, NY (US)

( * ) Notice: Subject to any disclaimer, the term of this patent is extended or adjusted under 35 U.S.C. 154(b) by 266 days.

(21) Appl. No.: 13/341,932

(22) Filed: Dec. 31, 2011

(65) Prior Publication Data
US 2013/0167777 A1    Jul. 4, 2013

(51) Int. Cl.
*A01K 29/00*    (2006.01)
(52) U.S. Cl.
USPC .......................... 119/165; 119/161
(58) Field of Classification Search
USPC ................. 119/165, 161, 163, 166
See application file for complete search history.

(56) References Cited

U.S. PATENT DOCUMENTS

| | | | |
|---|---|---|---|
| 2,725,141 A | 11/1955 | Latvala et al. | |
| D233,158 S | 10/1974 | Lowe | |
| 3,885,523 A | 5/1975 | Coleman | |
| 4,602,593 A | 7/1986 | Gross | |
| 4,667,662 A | 5/1987 | Breault | |
| 5,042,430 A | 8/1991 | Casmira | |
| 5,165,366 A | 11/1992 | Harvey | |
| 5,181,480 A | 1/1993 | Dabolt | |
| 5,329,878 A | 7/1994 | McCavley | |
| 5,351,646 A * | 10/1994 | Zoroufy | 119/497 |
| 5,363,808 A | 11/1994 | Edwards | |
| 5,458,088 A | 10/1995 | Owens | |
| 5,531,186 A | 7/1996 | Flood et al. | |
| 5,611,270 A | 3/1997 | Harrington | |
| 5,676,090 A | 10/1997 | Cannady, Jr. | |
| 5,713,302 A * | 2/1998 | Walter | 119/165 |
| 5,782,206 A | 7/1998 | Markowitz | |
| 5,842,438 A | 12/1998 | Messmer | |
| 5,855,186 A | 1/1999 | Larsen et al. | |
| 5,983,832 A | 11/1999 | Seo | |
| 5,992,350 A | 11/1999 | Manzo | |
| 6,109,211 A | 8/2000 | Tomlinson | |
| 6,109,212 A * | 8/2000 | Schacherbauer | 119/165 |
| 6,135,057 A | 10/2000 | Cummings | |
| 6,237,534 B1 * | 5/2001 | Schwartz | 119/165 |

(Continued)

OTHER PUBLICATIONS

Google Search #1 downloaded on Jul. 8, 2011 http://reviews.skymall.com/5773/203118927/improvements-cat-hole-cat-door-reviews/reviews.htm.

(Continued)

*Primary Examiner* — Kristen C Hayes
(74) *Attorney, Agent, or Firm* — Russ Weinzimmer & Associates P.C.

(57) ABSTRACT

A litter box having apparatus for catching and returning litter being tracked from the litter box, and a method of assembling the litter box. The litter box includes a container for containing litter. An opening and a litter return window are formed in the container. Stair steps defining slots therebetween extend from the opening. A litter return slide is disposed beneath the slots and slopes downward towards the litter return window. As the animal traverses the stair steps, litter adhering to the paws of the animal is dislodged and falls through the slots to be caught by the litter return slide. The dislodged litter travels down the litter return slide and through the litter return window so as to return the dislodged litter to the litter container. Thus, the animal is prevented from tracking litter beyond the litter box, so that litter cleanup is reduced and sanitation is enhanced.

20 Claims, 11 Drawing Sheets

(56) References Cited

U.S. PATENT DOCUMENTS

| | | | |
|---|---|---|---|
| 6,412,440 B2 | 7/2002 | Kobayashi | |
| 6,659,045 B2 | 12/2003 | Thompson | |
| 6,698,384 B2 | 3/2004 | Markowitz | |
| 6,976,661 B2 | 12/2005 | Lipscomb et al. | |
| 6,983,720 B2 * | 1/2006 | Lakela | 119/165 |
| 7,000,569 B2 | 2/2006 | Markowitz | |
| 7,011,042 B2 | 3/2006 | Martello et al. | |
| 7,011,046 B1 | 3/2006 | Kidwell | |
| 7,017,519 B1 * | 3/2006 | Deasy et al. | 119/166 |
| 7,096,824 B1 * | 8/2006 | Deasy | 119/166 |
| 7,207,292 B1 * | 4/2007 | Colten | 119/161 |
| 7,431,360 B1 | 10/2008 | Bielak | |
| 7,673,585 B1 * | 3/2010 | Emmi et al. | 119/168 |
| 7,913,649 B2 | 3/2011 | LeCavalier et al. | |
| 2002/0139313 A1 | 10/2002 | Mack, Jr. et al. | |
| 2005/0028745 A1 | 2/2005 | Baillie et al. | |
| 2005/0076844 A1 | 4/2005 | Lakela | |
| 2005/0258177 A1 | 11/2005 | Woodson | |
| 2006/0156991 A1 | 7/2006 | Burns et al. | |
| 2006/0196438 A1 | 9/2006 | Caputa et al. | |
| 2007/0075203 A1 | 4/2007 | Conlin | |
| 2009/0058115 A1 | 3/2009 | Freedman et al. | |
| 2014/0069342 A1 * | 3/2014 | Khalili | 119/165 |

OTHER PUBLICATIONS

Google Search #1 Downloaded on Jun. 20, 2012 http://www.amazon.com/Litter-Locker-Hygenic-Soiled-Disposal/dp/B004EEN5BE.

Google Search #2 Downloaded on Jun. 20, 2012 http://www.mythreecats.com/products/omega-paw-rolln-clean-hooded-litter-box.

Google Search #3 Downloaded on Jun. 20, 2012 http://www.petco.com/product/117058/Petco-Top-Entry-Cat-Litter-Box-with-Caddy.aspx.

"Clevercat Top Entry Litter Box" downloaded on Nov. 3, 2012 http://www.clevercatinnovations.com/top_entry_litterbox_about.aspx.

"Cat Hole Cat Door with Brush", http://www.petsmart.com/product/index.jsp?productID=2750683 Downloaded on Aug. 26, 2013.

* cited by examiner

US 8,733,286 B2

LITTER BOX WITH APPARATUS FOR CATCHING AND RETURNING TRACKED LITTER AND METHOD OF ASSEMBLING THE LITTER BOX

FIELD OF THE INVENTION

This invention generally relates to pet litter boxes, and more particularly relates to pet litter boxes intended to reduce escape of litter therefrom.

BACKGROUND OF THE INVENTION

A litter tray or litter box having litter therein is typically used by a pet cat, rabbit or other small pet animal for indoor collection of feces and urine. The litter material commonly used includes granulated moisture absorbing clay that includes aluminum silicates and/or other minerals. Other materials are also used as litter, such as wood chips, pelletized paper, pelletized grain, pelletized corncobs, and pelletized wheat straw grasses.

More specifically, the litter can be a "non-clumping" litter comprising sand or a mixture of zeolite, diatomite, and sepiolite. However, when removing animal waste from the litter box in which non-clumping litter was used, the entire contents of the litter box must be emptied. Alternatively, "clumping" litter may be used rather than non-clumping litter. Clumping litter, which can include bentonite clay (absorbent aluminum phyllosilicate) or diatomaceous earth, forms a relatively solid mass when wet. The solid mass can then be scooped from the litter box without emptying the entire contents of the litter box.

Some animals, such as cats, have a natural instinct to bury their waste in loose soil when the animal is in the wild. A litter box relies on this natural instinct to accomplish its function of collecting the animal's waste. In this regard, the litter box is filled with about one inch (2.5 centimeters) of the litter for simulating loose soil, so that the animal will instinctively bury its waste in the litter. However, it has been observed that the granulated or pelletized litter will often, at least temporarily, adhere to the animal's paws regardless of the composition of the litter, and regardless of whether the litter is non-clumping litter or clumping litter. When this occurs, the animal will then "track" the litter onto nearby surfaces as the animal exits the litter box.

In addition, about 80% of litter purchased by pet owners is the previously mentioned clumping litter rather than the non-clumping litter. However, clumping litter has a smaller average grain size and is lighter than non-clumping litter. In this regard, the litter grain size of the clumping litter may vary between approximately 0.019685 inch (0.5 millimeter) and approximately 0.059055 inch (1.5 millimeter). Therefore, there is a greater likelihood that the clumping litter typically used will be tracked, expelled, or otherwise scattered more easily from the litter box as the animal buries its waste in the litter.

Also, the litter tracked, expelled, and otherwise scattered by the animal onto nearby surfaces may be inadvertently tracked even further away from the vicinity of the litter box by humans walking or moving through an area near the litter box. The litter escaping the litter box due to the cat's paws tracking, expelling, or otherwise scattering the litter outside the litter box, and due to people walking near the litter box, results in time spent subsequently vacuuming, sweeping, and/or even mopping an area where the litter has escaped from the litter box. In addition, litter escaping the litter box might stain furniture fabric, carpeting, and other items located near the litter box. Moreover, the litter escaping the litter box and transferred to nearby surfaces creates an unsanitary indoor environment. This is so because the tracked and scattered litter may be contaminated with bacteria (e.g., *escherichia coli*) and protozoa (e.g., *toxoplasma gondii*) that can cause or exacerbate health issues in some people. Therefore, for all the forgoing reasons, it is desirable to prevent inadvertent escape of litter from the litter box.

Prior art approaches have been taken to prevent inadvertent escape of litter from a litter box. For example, an apparatus for preventing litter from being scattered upon the floor outside of a litter box and beyond, whether strewn by a cat during or after using the litter box, or by the owner when cleaning the litter box is disclosed in the prior art. In this regard, an enclosure is provided having a front side, a left side, a right side and a base. The device is designed to encourage the cat to step out of the litter box and into a tracked litter receptacle for collecting tracked litter. The device is further designed to corral not only litter tracked onto the bottom of the cat's paws, but litter tossed, flipped and spilled out of the litter box. However, use of this device appears to create at least two separate areas requiring cleanup. The two separate areas being the initial site where the litter is contained, and an additional site where the litter has been subsequently corralled. Cleaning two separate areas of tracked litter rather than a single area is time consuming and, hence, inconvenient.

Another known approach provides a sanitary cat path for use with a litter box, or a cat door, the sanitary cat path including an elevated apertured walkway operating to remove the litter or debris from the paws of the cat so that the litter or debris will not be deposited on the floor, and/or tracked about the home and, preferably, providing a tray for capturing the litter or debris and easily disposing of it. However, use of this device also creates at least two separate areas requiring cleanup, the two separate areas being the initial site where the litter is located, and the additional site where the tracked litter is subsequently captured by the tray. Cleaning two separate areas of tracked litter rather than a single area is time consuming and, consequently, inconvenient. In addition, this reference appears merely to disclose a tray useable with a conventional litter box, rather than a fully configured litter box construction that includes a tray.

Yet another known approach provides a louvered ramp that serves as a cat's paw-cleaning entry and exit ramp ascending to, and descending from, a cat litter box. However, this reference appears merely to disclose a louvered ramp useable with a conventional litter box.

SUMMARY OF THE INVENTION

A litter box having apparatus for reducing the tracking of litter beyond the litter box includes a container having a base and a cover that covers the base. A quantity of litter is contained in the base, the litter being for receiving animal waste, such as from a pet cat. In addition, a litter return window is formed in the base for purposes disclosed herein below. An opening formed in the cover allows the cat to move into and out of the container.

After using the litter, the cat typically has granulated particles of litter adhering to the bottom of its paws. To prevent transfer of the litter from the cat's paws to surfaces external to the container, such as furniture and floors, a litter removal pathway is coupled to the container. The pathway extends outwardly from the opening defined by the cover, and is configured to remove the litter from the paws of the cat. The pathway includes a plurality of stair steps defining slots therebetween, the slots extending through the pathway. As the cat traverses the plurality of stair steps, most of the litter adhering to the paws of the cat is removed by the stair steps, and falls downward through the slots. A downwardly sloping litter return guide, chute, or slide is disposed beneath the pathway and spans the slots. An end portion of the downwardly sloping litter return slide passes through the previously mentioned litter return window formed in the base. Thus, litter falling from the cat's paws and through the slots is caught by the litter return slide. Thereafter, the litter slidably travels downwardly along the litter return slide, so that the litter passes through the litter return window, and is returned to the base of the container to rejoin the litter contained within the base.

A pair of barriers may be coupled along sides of the pathway for guiding the cat along the pathway. In this manner, the cat remains on the pathway rather than prematurely jumping off a side of the pathway prior to sufficient transfer of litter from the cat's paws. In addition, a removable mesh or grate covering a top portion of the pathway can be provided for enhancing comfort of the cat as the cat traverses the pathway. Moreover, an obstruction can be removably coupled to the container and located at the opening for slowing exit of the animal through the opening. For example, a removable brush assembly may be provided near the opening formed in the cover for allowing the cat to rub against the brush as the cat exits the opening. The cat will instinctively linger or pause at the opening so as to rub itself against the brush. Pausing to rub itself against the brush will cause the cat to remain longer on the pathway for allowing more time for the litter to be dislodged from the cat's paws and to fall through the slots.

Further, a support structure is provided that serves a dual purpose. In this regard, the support structure is disposed beneath and is coupled to the pathway for supporting the pathway. In addition, the support structure substantially surrounds the litter return slide, but is spaced-apart from the litter return slide for defining a storage compartment between the litter return guide and the support structure. Thus the support structure simultaneously supports the pathway and defines a storage compartment between the litter return guide and the support structure. If desired, cleaning materials and/or litter bags may be conveniently stored in the compartment. The cleaning materials are used for cleaning the slide, base, and remainder of the container when desired and the litter bags are used for disposal of soiled litter.

Thus, the apparatus removes tracked litter from the bottom of the cat's paws and returns the tracked litter to the litter contained in the base of the container. In this manner, the apparatus prevents transfer, spillage, scattering and tracking of the cat litter onto nearby surfaces, such as furniture and floors. Preventing transfer, spillage, scattering, and tracking of the cat litter onto such surfaces and automatically returning the tracked litter to the litter contained in the litter container avoids time needed to clean escaped litter from the nearby surfaces. In addition, preventing transfer, spillage, scattering, and tracking of the cat litter from the container enhances sanitation by reducing likelihood of contamination of nearby surfaces by bacteria and protozoa that could pose a health hazard to people.

A first general aspect of the invention is a litter box having apparatus for catching and returning tracked litter, the litter box including: a container for containing litter, the container defining an opening for allowing exit of an animal, and the container defining a litter return window for allowing return of tracked litter to the container; a pathway extending from the opening for enabling travel of the animal therealong after exiting the opening, the animal tracking the litter along the pathway after exiting the container, the pathway having at least one slot therethrough for passage of the tracked litter down through the at least one slot; and a litter return slide disposed beneath the pathway and through the litter return window, the litter return slide being for catching the tracked litter passing down through the at least one slot, and then for slidably returning the tracked litter through the litter return window and into the container.

In some embodiments, the litter box further includes a barrier coupled to the pathway for blocking exit of the animal from the pathway.

In some embodiments, the pathway includes a grate for enhancing support of the animal while the animal travels along the pathway. In further embodiments, the grate is removable.

In some embodiments, the litter box further includes a brush cooperative with the opening defined by the container so as to allow the animal to rub against the brush while the animal exits the opening.

In some embodiments, the litter box further includes a support structure coupled to the pathway for supporting the pathway. In further embodiments, the support structure substantially surrounds the litter return slide, the support structure and the litter return slide together defining a storage compartment therebetween. In still further embodiments, the support structure includes an access door for allowing access to the compartment.

In some embodiments, the pathway includes a plurality of stair steps.

In some embodiments, the litter box further includes an obstruction removably coupled to the container and disposed at the opening for slowing exit of the animal through the opening.

Another general aspect of the invention is a litter box having apparatus for catching and returning tracked litter, the litter box including: a container having a base for containing the litter and a cover for covering the base, the cover defining an opening for allowing exit of an animal tracking the litter from the base, the base defining a litter return window for allowing return into the base of tracked litter through the litter return window; a plurality of stair steps defining an inclined pathway extending from the opening for travel therealong of the animal exiting the opening, adjacent pairs of stair steps each defining a slot therebetween for passage of the tracked litter down through the slot; and a litter return slide disposed beneath the plurality of stair steps for catching the tracked litter passing through each slot therein, the litter return slide downwardly extending from the plurality of stair steps and through the litter return window, tracked litter passing through the slot while the animal tracks the litter from the base, the litter return slide catching the tracked litter after the tracked litter passes through each slot, whereafter the tracked litter slides along the litter return slide and through the litter return window and back into the base.

In some embodiments, the litter box further includes a pair of oppositely disposed barriers coupled to the pathway for blocking exit of the animal from the pathway.

In some embodiments, the pathway includes a rubberized grate for enhancing comfort of the animal while the animal travels along the pathway and across the grate. In further embodiments, the grate is removable from the pathway.

In some embodiments, the litter box further includes a rubberized brush coupled to the cover and cooperative with the opening defined by the cover for allowing the animal to rub against the brush while the animal exits the opening.

In some embodiments, the litter box further includes a support structure coupled to the plurality of stair steps for supporting the plurality of stair steps. In further embodiments, the support structure substantially surrounds the litter return slide, the support structure and the litter return slide together defining a storage compartment therebetween. In still further embodiments, the support structure includes an access door in communication with the compartment for allowing access to the compartment.

In some embodiments, the litter box further includes an obstruction removably coupled to the container and disposed at the opening for slowing exit of the animal through the opening.

Another general aspect of the invention is a method of assembling a litter box having apparatus for catching and returning tracked litter. The method includes: providing a container for containing the litter, the container defining an opening for allowing exit of an animal tracking litter from the container and defining a litter return window for allowing return of the tracked litter to the container; extending a pathway from the opening for travel therealong of the animal exiting the opening, the animal tracking the litter from the container and along the pathway, the pathway defining at least one slot therethrough for passage of the tracked litter through the at least one slot; and disposing a litter return slide beneath the at least one slot and through the litter return window, the litter return slide being for catching the tracked litter passing through the at least one slot, and being for slidably returning the tracked litter through the litter return window and into the container.

BRIEF DESCRIPTION OF THE DRAWINGS

The invention will be more fully understood by reference to the detailed description in conjunction with the following figures, wherein.

DETAILED DESCRIPTION OF PREFERRED EMBODIMENTS

Figure 1:
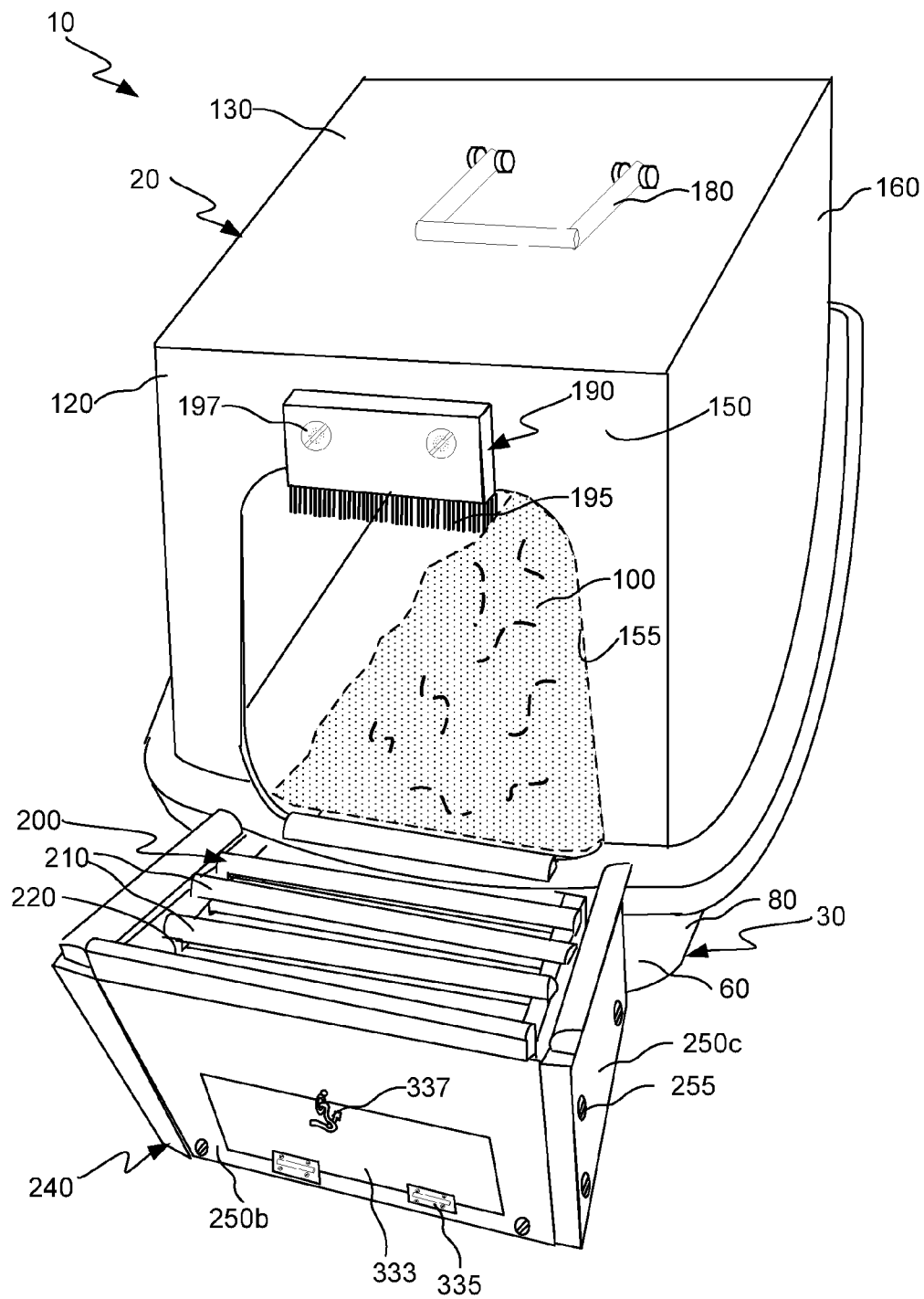
FIG. 1 is a view in perspective of a first embodiment of the litter box with apparatus for catching and returning litter being tracked therefrom by an animal, such as a cat.
Figure 2:
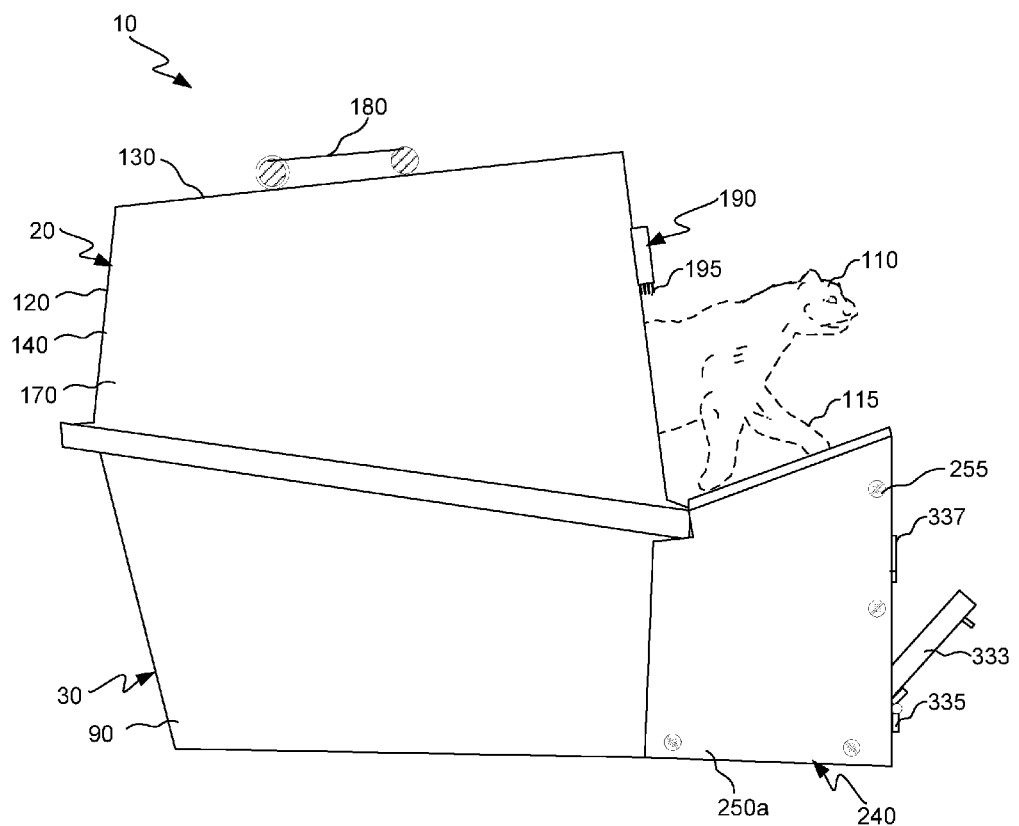
FIG. 2 is a view in elevation of the embodiment of FIG. 1.
Figure 3:
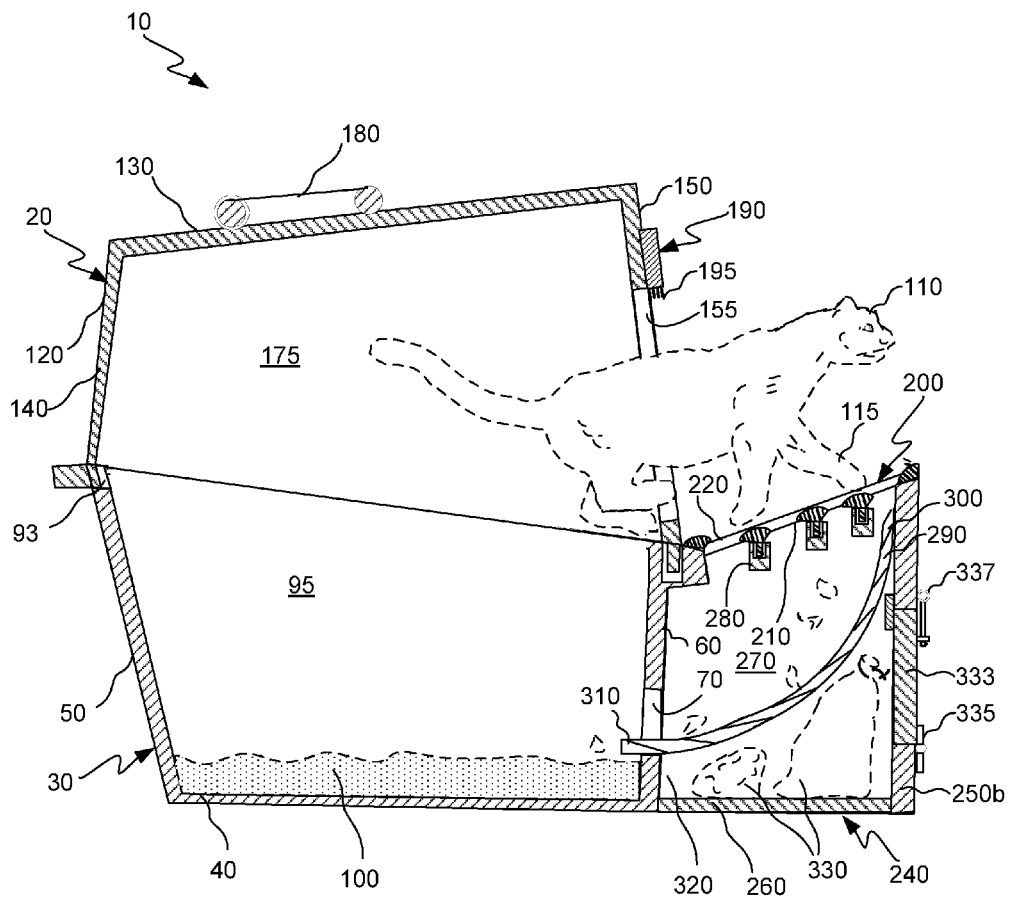
FIG. 3 is a view in vertical section of the embodiment of FIG. 1.

With reference to FIGS. 1, 2 and 3, there is shown a first embodiment apparatus, generally referred to as 10, for catching and returning litter being tracked therefrom. First embodiment apparatus 10 includes a container, generally referred to as 20, having a generally parallelpiped-shaped base 30. The base 30 includes a horizontal floor 40, an upright rear base panel 50 integrally formed with floor 40, and an upright front base panel 60 disposed opposite rear base panel 50 and integrally formed with floor 40. Front base panel 60 defines a litter return window 70 therein for reasons disclosed hereinbelow. Base 30 further includes an upright first base side panel 80 integrally formed with floor 40, rear base panel 50 and front base panel 60. In addition, container 20 includes an upright second base side panel 90 disposed opposite first base side panel 80 and integrally formed with floor 40, rear base panel 50 and front base panel 60. An upper perimeter of base 30 may define a recess 93 therearound for reasons disclosed hereinbelow. This configuration of base 30 defines an open lower volume 95 in container 20 that holds litter 100 therein. Litter 100, which is disposed on floor 40, may include a granulated non-clumping litter material, such as sand or a mixture of zeolite, diatomite and sepiolite. Alternatively, litter 100 may include a granulated clumping litter material, such as bentonite clay (absorbent aluminum phyllosilicate) or diatomaceous earth. A purpose of litter 100 is to receive and absorb fecal matter and urine deposited therein by a pet animal, such as a cat 110 possessing feet or paws 115.

Referring again to FIGS. 1, 2 and 3, container 20 also has a generally parallelpiped-shaped cover 120 sized to be mounted on base 30 for covering base 30. Cover 120 includes a ceiling or top panel 130, a generally vertical rear cover panel 140 integrally formed with top panel 130, and a generally vertical front cover panel 150 disposed opposite rear cover panel 140 and integrally formed with top panel 130. Front cover panel 150 defines an opening 155 therein for ingress and egress of cat 110 respectively into and out of container 20. Cover 120 further includes a vertical first cover side panel 160 integrally formed with top panel 130, rear cover panel 140, and front cover panel 150. In addition, container 20 includes a generally vertical second cover side panel 170 disposed opposite first cover side panel 160 and integrally formed with top panel 130, rear cover panel 140 and front cover panel 150. This configuration of cover 120 defines an open upper volume 175 in container 20. A handle 180 may be connected to top panel 130 for lifting cover 120 from base 30 and for lowering cover 120 onto base 30. When cover 120 is lowered onto base 30, a lower perimeter of cover 120 will be received in recess 93 defined by the upper perimeter of base 30 in order to releasibly secure cover 120 to base 30. In addition, a brush assembly, generally referred to as 190, including a plurality of rubberized bristles 195 may be connected to cover 120 at a location near opening 155 for reasons disclosed hereinbelow. Brush assembly 190 is connected to cover 120 by removable fastener means, such as by a suitable adhesive (not shown) or at least one screw 197. As another example, brush assembly 190 may be connected to cover 120 by means of a pressure latch (not shown), clip (also not shown) or other suitable removable fastener means. In this manner, if not needed, brush assembly 190 can be removed by removal of screw 197, the pressure latch, the clip or the other means used to connect brush assembly 190 to cover 120. Container 20 may be made from any suitable light-weight material, so that container 20 is portable and manually locatable in any convenient location. In this regard, container 20 may be a light-weight metal, such as thin gauge aluminum, or a suitable durable light-weight plastic material, such as acrylonitrile-butadiene styrene.

As previously mentioned, it has been observed that, after cat 110 uses litter 100, particles of granulated or pelletized litter from litter 100 may, at least temporarily, adhere to the cat's paws 115. When this occurs, cat 110 will then track the litter onto nearby surfaces as cat 110 exits container 20. It is desirable to prevent cat 110 from tracking the litter onto nearby surfaces to avoid time consuming cleanup and to reduce risk of contaminating the nearby surfaces with disease causing bacteria and protozoa.

Therefore, referring to FIGS. 1, 2, 3, 4 and 5, an inclined walkway or pathway, generally referred to as 200, that removes or dislodges tracked litter from paws 115 of cat 110 is provided. Pathway 200 upwardly outwardly extends from opening 155 and includes a plurality of ascending stair steps 210 arranged parallel one to another. At least some of stair steps 210 may be rubber or similar material for allowing cat 110 to comfortably travel or traverse along pathway 200. By way of example only, and not by way of limitation, there may be five stair steps 210. Alternatively, there may be more or fewer than five stair steps 210, if desired. However, it may be appreciated that the greater the number of stair steps, the greater the likelihood that all tracked litter will be removed from paws 115 of cat 110. In addition, although pathway 200 is described herein as being upwardly inclined or ascending, it may be understood, based on applicant's teachings herein, that pathway 200 may be level or downwardly sloping or descending, if desired. Moreover, stair steps 210 may successively increase in length to progressively widen pathway 200 as pathway 200 extends from opening 155, if desired. Stair steps 210 are spaced-apart, so that adjacent ones of stair steps 210 each define a slot 220 therebetween for reasons provided hereinbelow.

Referring again to FIGS. 1, 2, 3, 4 and 5, a surface 230 of each stair step 210 may be textured for facilitating removal of tracked litter from paws 115 of cat 110. Surface 230 may be textured by means of a multiplicity of raised bumps or nodules 235, or other suitable texturing. Moreover, surface 230 of each stair-step 210 may be curved or convex, as shown, so that tracked litter more easily falls away from stair step 210. In this manner, likelihood of tracked litter re-adhering to paws 115 as the cat 110 travels pathway 200 is reduced. In addition, presence of previously mentioned brush assembly 190, which forms an obstruction at opening 155, allows cat 110 to rub against bristles 195 as cat 110 exits opening 155 of container 20 and initiates travel along pathway 200. It has been observed that cat 110 will tend to instinctively linger at opening 155 and delay travel along pathway 200 while cat 110 rubs against bristles 195. This is beneficial because the longer cat 110 remains on pathway 200, the greater the likelihood that tracked litter will be dislodged from paws 115.

Referring again to FIGS. 1, 2, 3, 4 and 5, first embodiment apparatus 10 further includes a support structure, generally referred to as 240, coupled to pathway 200 for supporting pathway 200. Material comprising support structure 240 may be thin gauge aluminum, or a suitable durable plastic material, such as acrylonitrile-butadiene styrene. Support structure 240 includes three upright side walls, such as left sidewall 250a, center sidewall 250b and right sidewall 250c. Left side wall 250a and right side wall 250c are connected to center side wall 250b, such as by means of a suitable epoxy adhesive (not shown) or at least one screw fastener 255. Side walls 250a/b/c are perpendicularly disposed and integrally connected to each other. Side walls 250a/b/c are also integrally connected to a floor 260, such as by means of a suitable epoxy adhesive or at least one screw fastener 255. Hence, one side of support structure 240 is not bounded by a side wall. In this manner, side walls 250a/b/c and floor 260 define an open volume 270 in support structure 240.

Still referring to FIGS. 1, 2, 3, 4 and 5, support structure 240 is coupled to front base panel 60, such as being positioned sufficiently adjacent to front base panel 60, so that open volume 270 is in communication with litter return window 70, as shown. Each of opposing side walls 250a and 250c define a plurality of spaced-apart cutouts 280 along a upper edge of each side wall 250a and 250c for receiving opposing ends of respective ones of the plurality of stair steps 210. In this manner, each of stair steps 210 is supported by side walls 250a and 250c because opposing ends of stair steps 210 are received in cutouts 280 and supported therein. In addition, disposed in volume 270 is a concave or arcuate shaped litter return guide, chute or slide 290 having a first end portion 300 thereof connected to an inside surface of center side wall 250b. Litter return slide 290 may be thin gauge aluminum, or a suitable durable plastic material, such as acrylonitrile-butadiene styrene. First end portion 300 of litter return slide 290 is connected to the inside surface of center side wall 250b by any convenient means, such as by at least one suitable screw fastener (not shown) or by a suitable epoxy adhesive. A second end portion 310 of litter return slide 290 extends through litter return window 70 that is formed in previously mentioned front base panel 60.

Referring yet again to FIGS. 1, 2, 3, 4 and 5, as cat 110 traverses stair steps 210 belonging to pathway 200, tracked litter clinging to paws 115 will be dislodged from paws 115 due to textured surface 230 of stair steps 210 and due to the mechanical friction occurring between paws 115 and stair steps 210. As the tracked litter is dislodged from paws 115 by stair steps 210, the tracked litter will fall from the curved or convex surface 230 of stair steps 210 and through slots 220. As the tracked litter falls through slots 220, the tracked litter will be received onto litter return slide 290 and slide downwardly therealong. As the tracked litter slides downwardly along litter return slide 290, the tracked litter will pass through litter return window 70 to be returned to litter 100 in container 20. In this manner, first embodiment apparatus 10 catches litter tracked from container 20 by cat 110 and automatically and simultaneously returns the tracked litter to container 20.

Figure 4:
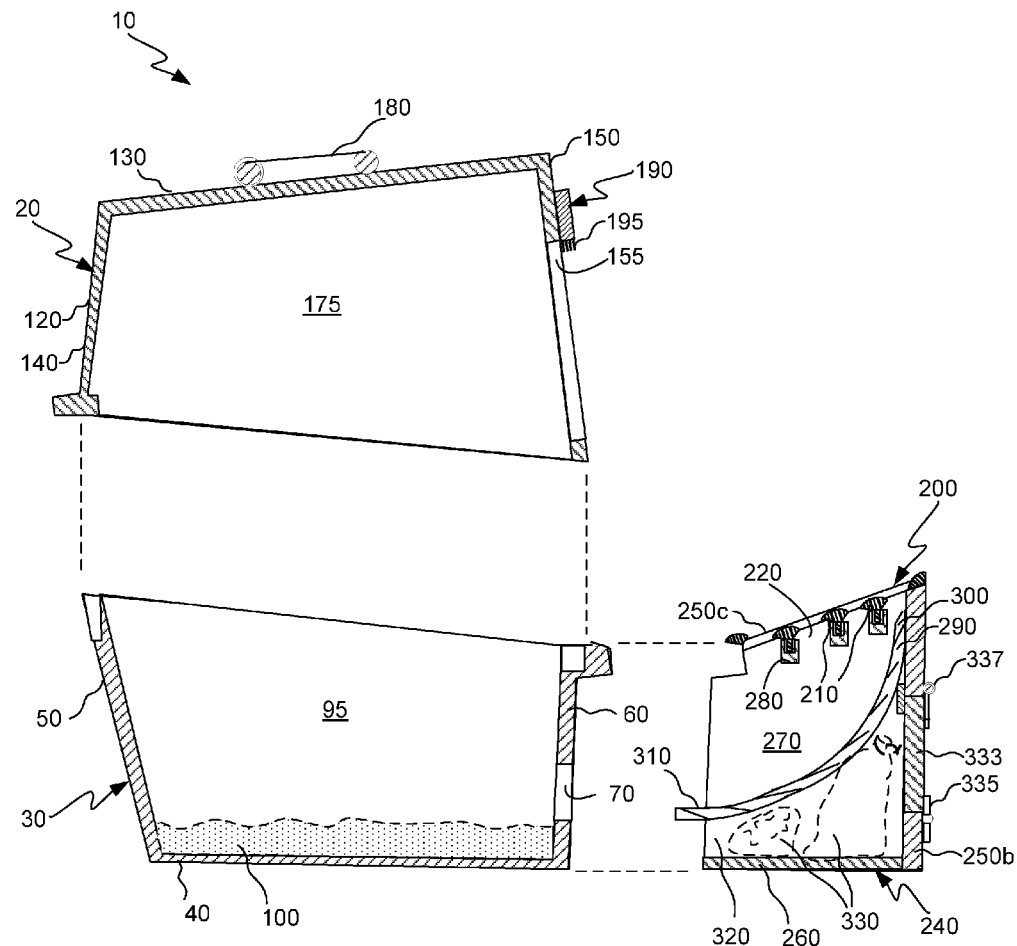
FIG. 4 is an exploded view in vertical section of the embodiment of FIG. 1.
Figure 5:
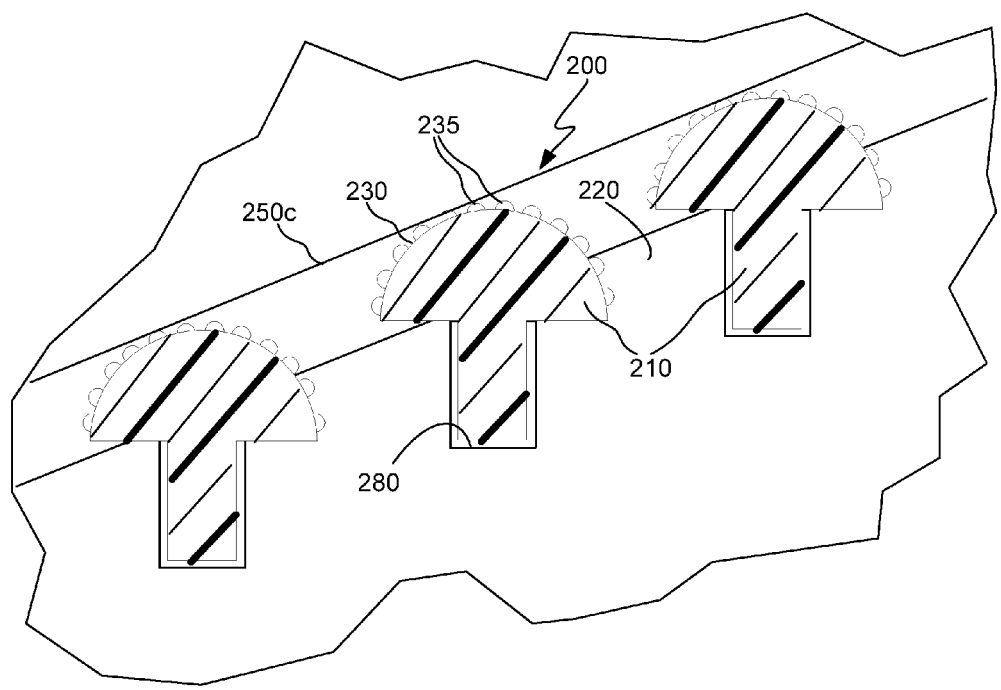
FIG. 5 is a fragmentary view in vertical section of a pathway belonging to the embodiment of FIG. 1, the pathway including a plurality of stair steps.

As best seen in FIGS. 3 and 4, litter return slide 290 divides volume 270, so as to define a compartment 320 between litter return slide 290, side walls 250a/b/c and floor 260. Compartment 320 may be used to store cleaning materials and/or litter bags 330, if desired. The cleaning materials are used for cleaning litter return slide 290 and other portions of first embodiment apparatus 10 and the litter bags are used for disposal of soiled litter that is placed into the litter bags. The cleaning materials and litter bags 330 form no part of the present invention. A hinged door 333 is formed in center side wall 250b for allowing access to compartment 320. Door 333 is connected to center side wall 250b by means of at least one hinge 335 and can be locked in a closed position, such as by a hook fastener arrangement 337.

With particular reference to FIG. 4, first embodiment apparatus 10 is illustrated as including three separate enclosures. In other words, first embodiment apparatus 10 is illustrated as including previously mentioned base 30, cover 120 and support structure 240 as separate enclosures that can be assembled into a single unit. However, it should be appreciated, based on applicant's teachings herein, that base 30, cover 120 and support structure 240 may be manufactured as a single-piece enclosure rather than as a three-piece enclosure that is subsequently assembled together. That is, base 30, cover 20 and support structure 240 may be manufactured as a single unit, so as to prevent inadvertent formation of open seems or gaps in first embodiment apparatus 10. Although unlikely, inadvertent formation of open seems or gaps might occur during assembly of the three-piece configuration of first embodiment apparatus 10. A single-piece configuration, rather than a three-piece configuration, provides added assurance that open seems or gaps are prevented. Such a construction prevents litter that may fall from cat 110 otherwise passing through such open seems or gaps to land outside first embodiment apparatus 10.

Figure 6:
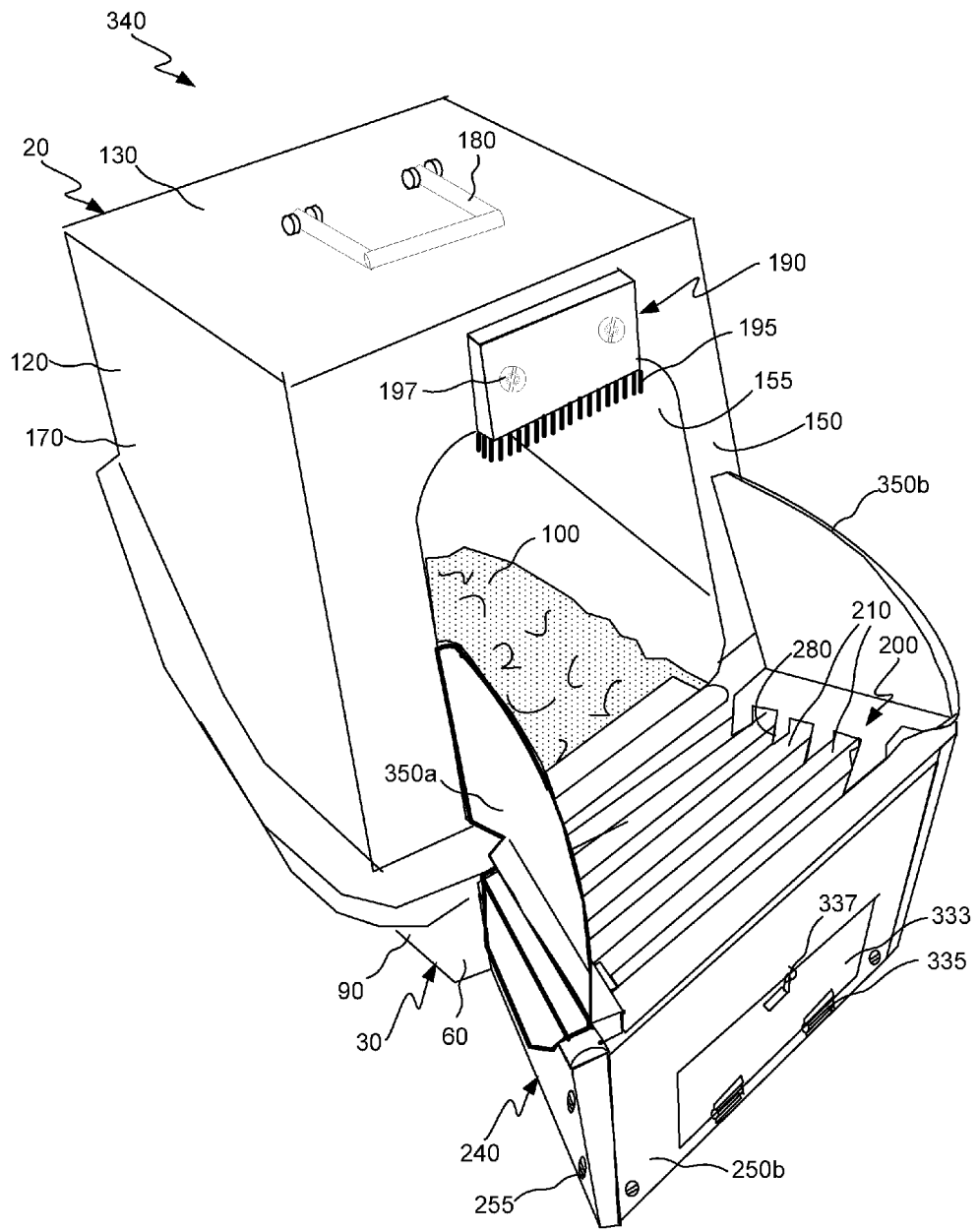
FIG. 6 is a view in perspective of a second embodiment of the litter box having apparatus for catching and returning litter being tracked therefrom.

Turning now to FIG. 6, there is shown a second embodiment apparatus, generally referred to as 340, for catching and returning litter being tracked therefrom. Second embodiment apparatus 340 is substantially similar to first embodiment apparatus 10, except that a pair of barriers 350a and 350b are removably connected to opposing side edges of pathway 200. Barriers 350a/b discourage cat 110 from prematurely leaving pathway 200 before completely traversing pathway 200. Prematurely leaving pathway 200 reduces the likelihood that sufficient tracked litter will be removed from paws 115 of cat 110.

Figure 7:
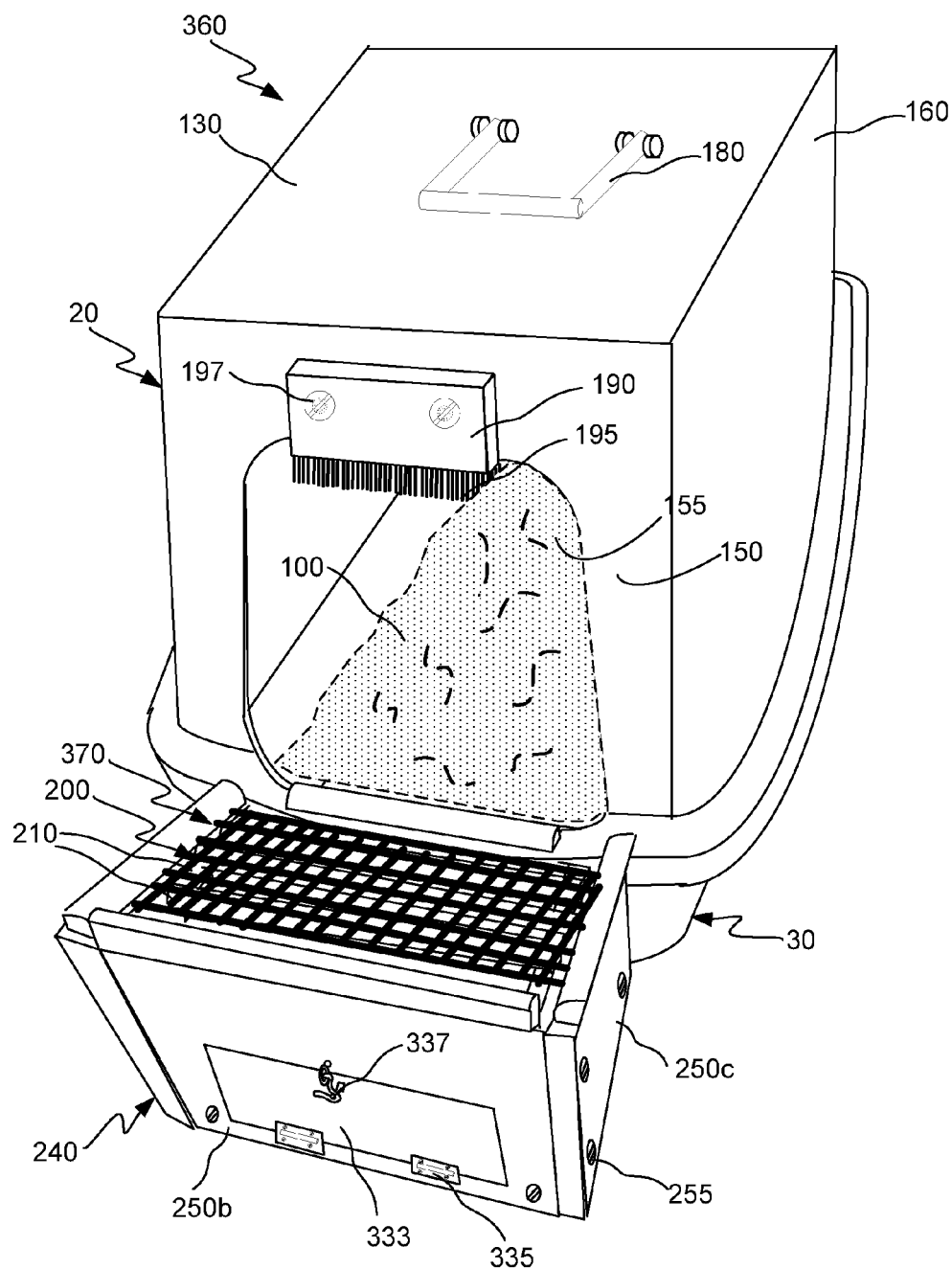
FIG. 7 is a view in perspective of a third embodiment of the litter box having apparatus for catching and returning litter being tracked therefrom.

Referring to FIG. 7, there is shown a third embodiment apparatus, generally referred to as 360, for catching and returning litter being tracked therefrom. Third embodiment apparatus 360 is substantially similar to first embodiment apparatus 10, except that a rubberized screen, mesh or grate 370 is mounted on top of and spans stair steps 210. It has been observed that cat 110 may sometimes prefer traversing pathway 200 when pathway 200 has grate 370 thereon. This aspect of cat behavior can be advantageously used to encourage cat 110 to traverse pathway 200, so that tracked litter is removed from paws 115 of cat 110. In addition, it may be appreciated that, when grate 370 is present, some of stair steps 210 may be removed, if desired. However, in this case, it is desirable that one or more middle-most stair steps 210 remain to support the weight of cat 110 as cat 110 walks across grate 370.

Figure 8:
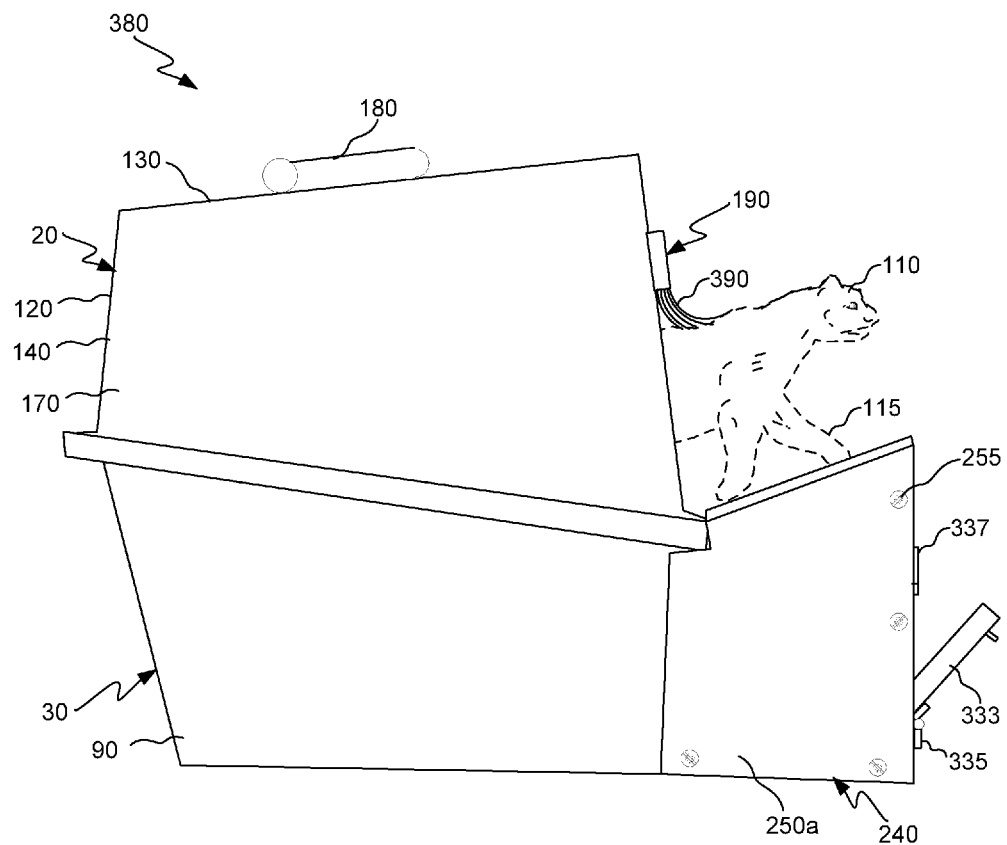
FIG. 8 is a view in elevation of a fourth embodiment of the litter box having apparatus for catching and returning litter being tracked therefrom.

Referring to FIG. 8, there is shown a fourth embodiment apparatus, generally referred to as 380, for catching and returning litter being tracked therefrom. Fourth embodiment apparatus 380 is substantially similar to first embodiment apparatus 10, except that brush assembly 190 includes a plurality of substantially longer rubberized bristles 390. The substantially longer bristles 390 form an obstruction at opening 155 for slowing exit of cat 110 through the opening 155. That is, the substantially longer bristles 390 are longer than previously mentioned bristles 195. Substantially longer bristles 390 are sufficiently long to contact cat 110 and interfere with cat's 110 exit through opening 155 for reasons disclosed presently. In this regard, it has been observed that cat 110 may leap over the length of pathway 200 when exiting opening 155, rather than walking on pathway 200. When this occurs, paws 115 of cat 110 will not contact stair steps 210 in order to remove litter from paws 115. Therefore, substantially longer rubberized bristles 390 will contact cat 110 as cat 110 exits opening 155 and cause cat 110 to pause long enough at opening 155 to prevent cat 110 from gaining enough momentum to leap over the length of pathway 200.

Figure 9:
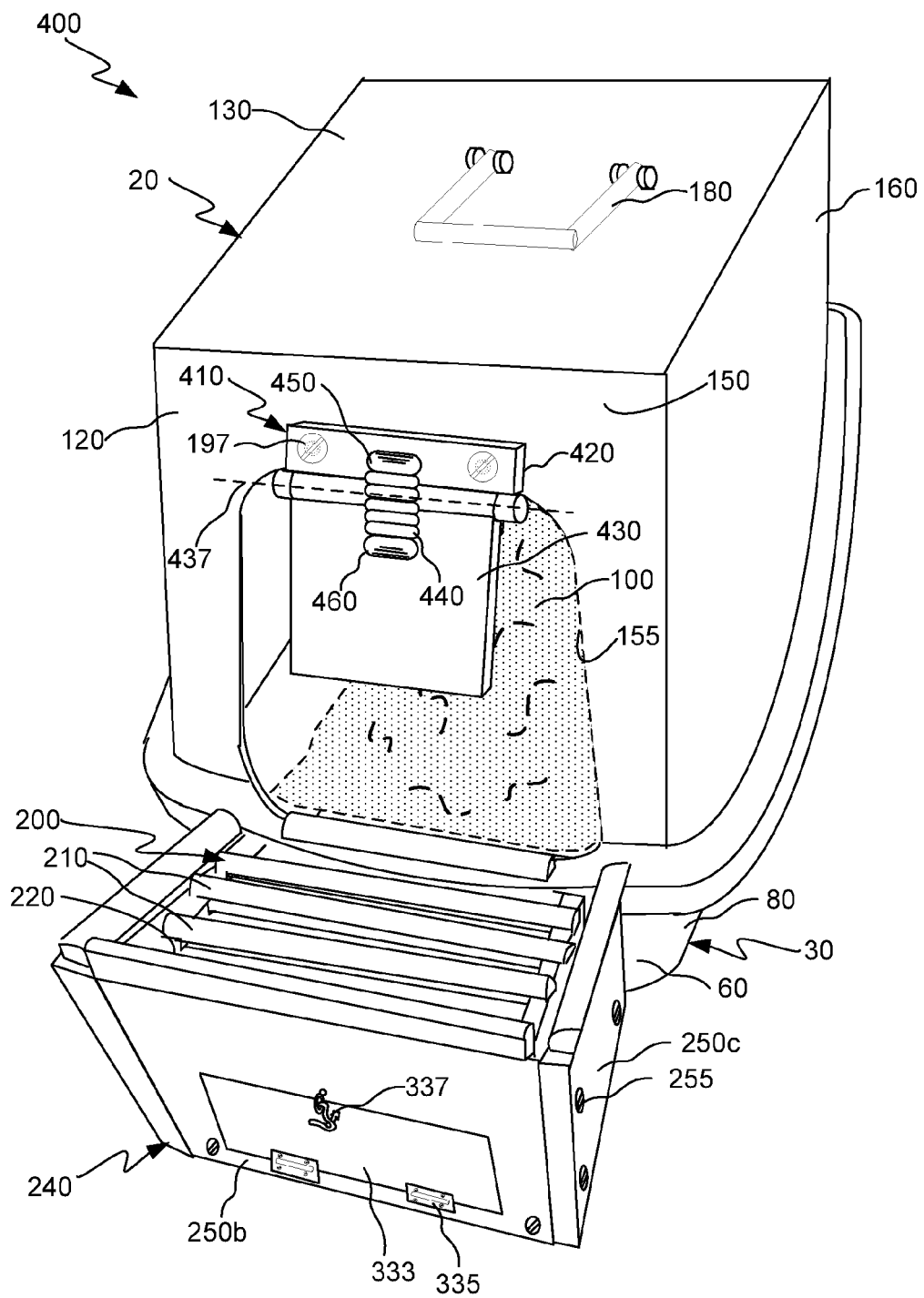
FIG. 9 is a view in perspective of a fifth embodiment of the litter box having apparatus for catching and returning litter being tracked therefrom.
Figure 10:
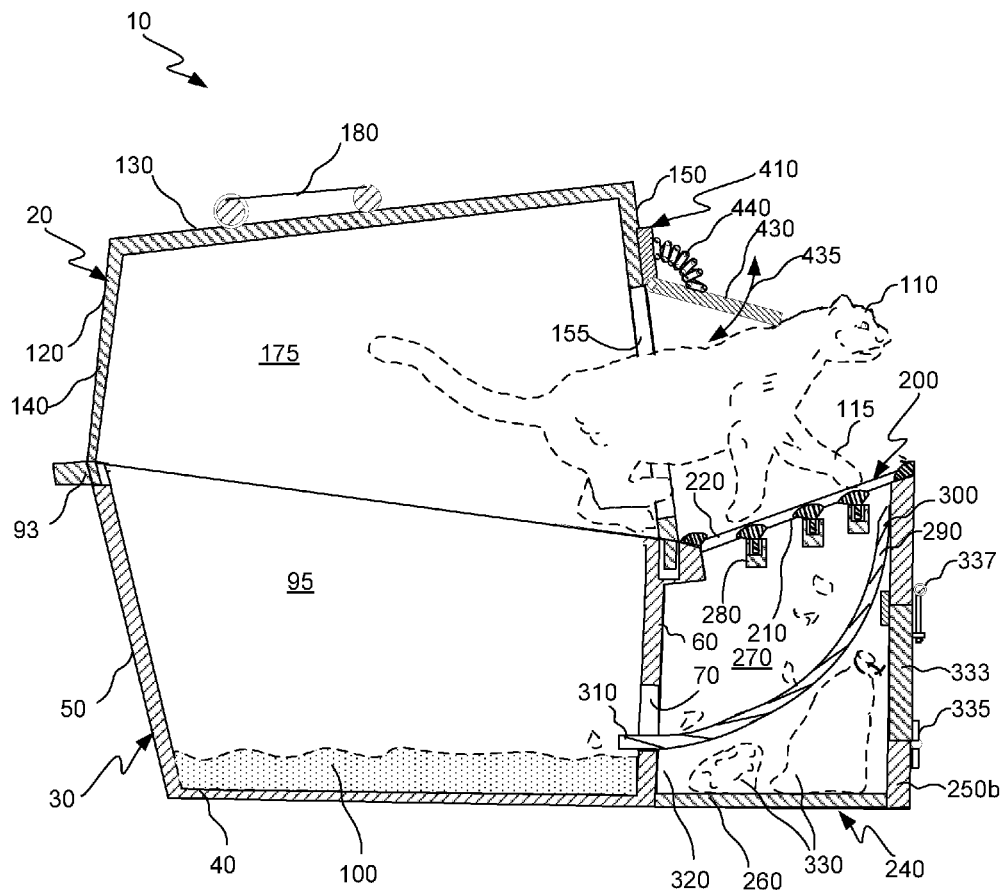
FIG. 10 is a view in vertical section of the embodiment of FIG. 9.

Referring to FIGS. 9 and 10, there is shown a fifth embodiment apparatus, generally referred to as 400, for catching and returning litter being tracked therefrom. Fifth embodiment apparatus 400 is substantially similar to first embodiment apparatus 10, except that a hinged, removable door assembly, generally referred to as 410, is substituted for brush assembly 190. Door assembly 410 forms an obstruction at opening 155 for slowing exit of cat 110 through the opening 155. More specifically, door assembly 410 includes a support plate 420 disposed above opening 155 and connected to cover 120. Support plate 420 is disposed above opening 155 and connected to cover 120 by removable fastener means, such as by a suitable epoxy adhesive (not shown) or at least one screw 197. As another example, door assembly 410 may be connected to cover 120 by means of a pressure latch (not shown), clip (also not shown) or other suitable removable fastener means. Door assembly 410 includes a panel or door 430 that is suspended from support plate 420. Door 430 is rotatably connected to support plate 420, so that door 430 is capable of swinging, pivoting or rotating, relative to support plate 420. In this regard, door 430 will swing, pivot or rotate in the direction of arrow 435 about a horizontal fixed axis of rotation 437.

Referring again to FIGS. 9 and 10, an elastic member, such as a spring 440, has a first end portion 450 thereof connected to support plate 420 and a second end portion 460 thereof connected to door 430, as shown. First end portion 450 and second end portion 460 of spring 440 are connected to support plate 420 and door 430, respectively, by any suitable means, such as by a suitable epoxy adhesive, weldments, screws, bolts or the like. Door 430 contacts cat 110 and interferes with cat's 110 exit through opening 155 for reasons disclosed presently. In this regard, it has been observed that cat 110 may leap over the length of pathway 200 when exiting opening 155, rather than walking on pathway 200, as previously mentioned. When this occurs, paws 115 of cat 110 will not contact stair steps 210 in order to remove litter from paws 115. Spring 440 compresses or contracts as door 430 outwardly and upwardly rotates about axis 435. The spring constant of spring 440 is selected so as to provide sufficient resistance to cat 100 when cat 110 pushes against door 430 to exit opening 155. In this manner, door 430 causes cat 110 to pause long enough at opening 155 to prevent cat 110 from gaining enough momentum to leap over the length of pathway 200. Spring 440 is elastic, as previously mentioned. Therefore, spring 440 will relax or expand and cause door 430 to downwardly rotate about axis 435 to a vertical position after cat 110 exits opening 155. The configuration of door 430 also allows cat 110 ready access to the interior of container 30. In this regard, door 430 will inwardly and upwardly rotate about axis 435 as cat 110 contacts door 430 to enter container 20 through opening 155. Thus, spring 400, in combination with door 430, simultaneously provides ready egress out of container 20 and ready ingress into container 20 as wells as preventing cat 110 from leaping over pathway 200.

Still referring to FIGS. 9 and 10, and as previously mentioned, door assembly 410 is connected to cover 120 by removable fastener means, such as by an adhesive, at least one screw 197, a pressure latch, clip or other suitable removable fastener means. Removing the adhesive, screw 197, pressure latch, clip or other fastener means allows removal of support plate 420. In this manner, door assembly 410 can be removed by removing support plate 420, when door assembly 410 is not needed.

Illustrative Methods

An illustrative method associated with an exemplary embodiment for assembling an apparatus for catching and returning litter being tracked therefrom will now be described.

Figure 11:
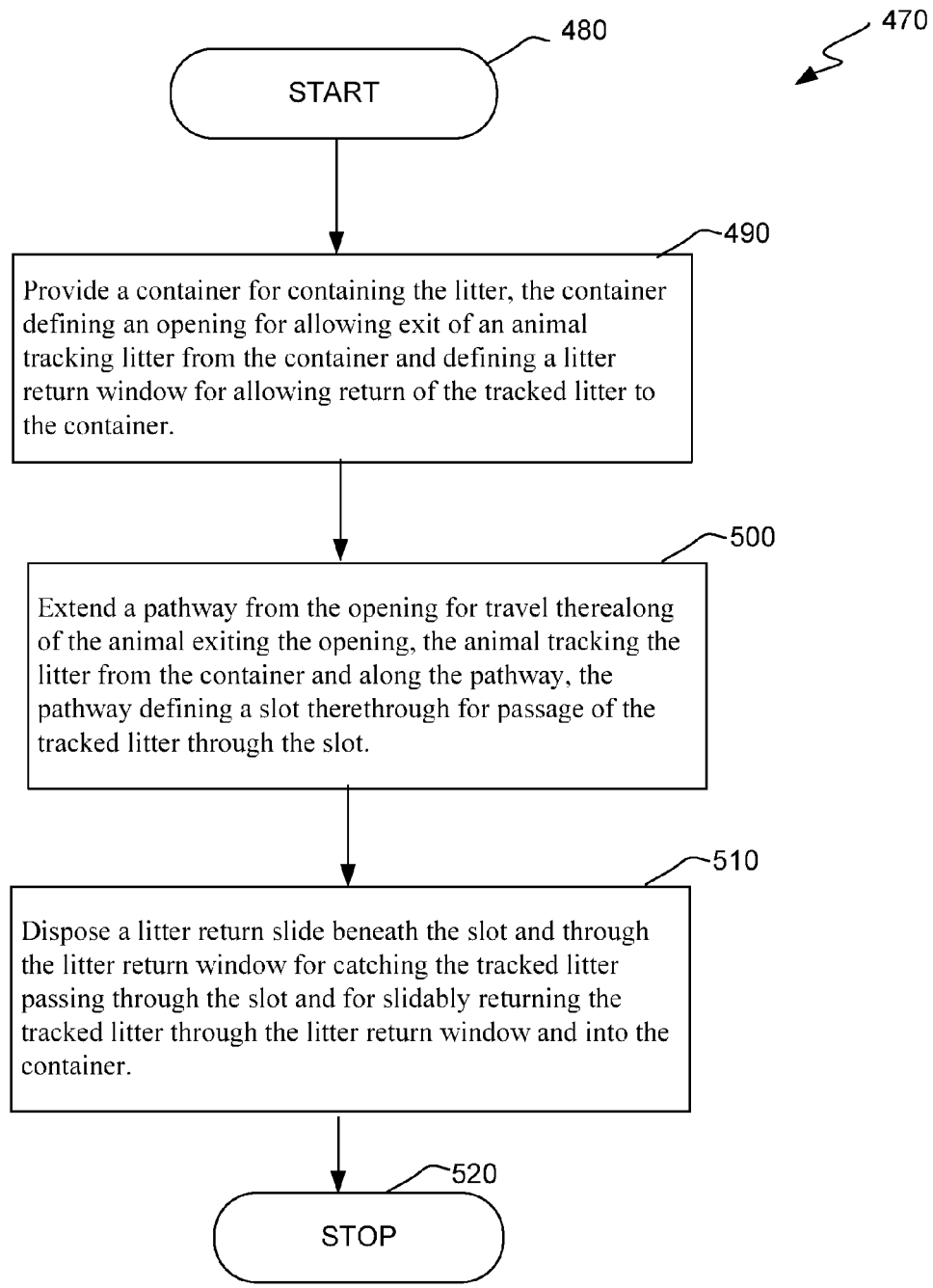
FIG. 11 is a flowchart of an illustrative method of assembling a litter box having apparatus for catching and returning litter being tracked therefrom.

Referring to FIG. 11, an illustrative method 470 that is provided for assembling an apparatus for catching and returning litter being tracked therefrom starts at a block 480. At a block 490, a container for containing the litter is provided, the container defining an opening for allowing exit of an animal tracking litter from the container and defining a litter return window for allowing return of the tracked litter to the container. At a block 500, a pathway is extended from the opening for travel therealong of the animal exiting the opening, the animal tracking the litter from the container and along the pathway, the pathway defining a slot therethrough for passage of the tracked litter through the slot. At a block 510, a litter return slide is disposed beneath the slot and through the litter return window for catching the tracked litter passing through the slot and for slidably returning the tracked litter through the litter return window and into the container. The method stops at a block 520.

Other modifications and implementations will occur to those skilled in the art without departing from the spirit and the scope of the invention as claimed. For example, the apparatus may be made from a transparent plastic material, such as acrylic (i.e., polymethlamethacylate) for viewing the interior of container 20 and support structure 240. Ability to view the interior of container 20 and support structure 240 assists in determining when apparatus 10/340/360 needs to be cleaned and the litter 100 emptied. Accordingly, the description hereinabove is not intended to limit the invention, except as indicated in the following claims.

What is claimed is:

1. A litter box having apparatus for catching and automatically returning tracked litter back into the litter box, the litter box comprising:
    a container for containing litter for use by an animal, the container defining an opening for allowing exit of the animal from the container and a litter return window;
    a pathway extending from the opening, the pathway having a plurality of slots there along for passage therethrough of the litter tracked by the animal when the animal travels along the pathway after exiting the container through the opening; and
    a litter return slide disposed beneath the pathway and configured to catch the tracked litter passing down through each of the plurality of slots, the litter return slide having a first end in communication with the litter return window and being downwardly sloped to the first end for slidably returning the tracked litter through the litter return window and back into the container automatically.

2. The litter box of claim 1, further including a barrier coupled to the pathway for encouraging the animal to travel the pathway in its entirety before departing therefrom.

3. The litter box of claim 1, further including a brush cooperative with the opening defined by the container so as to allow the animal to rub against the brush while the animal exits the opening.

4. The litter box of claim 1, further including a support structure coupled to the pathway for supporting and elevating the pathway above the litter return slide.

5. The litter box of claim 4, wherein the support structure includes a bottom wall and at least one vertical wall coupled to the bottom wall to substantially surround the litter return slide, the litter return slide having a second end attached to the at least one vertical wall, the first end of the litter return slide in communication with the litter return window through an at least partially open end of the support structure.

6. The litter box of claim 5, wherein the bottom wall, the at least one vertical wall, and the litter return slide together define a storage compartment therebetween, the support structure including an access door in the at least one vertical wall for allowing access to the compartment.

7. The litter box of claim 1 wherein the pathway is inclined upwardly from the opening and includes a plurality of stair steps, the plurality of slots being formed therebetween.

8. The litter box of claim 7, wherein the pathway includes a grate, removably disposed over the steps, for enhancing support of the animal while the animal travels along the pathway.

9. The litter box of claim 8, wherein the steps are convex in shape and covered with a textured surface that creates friction between the animal's paws and the steps.

10. The litter box of claim 9 wherein each of the plurality of steps are independently removably supported by the support structure.

11. The litter box of claim 1, further including an obstruction removably coupled to the container and disposed at the opening for slowing exit of the animal through the opening.

12. A litter box having apparatus for catching and automatically returning tracked litter back into the litter box, the litter box comprising:
    a container having a base for containing the litter and a cover for covering the base, the cover defining an opening for allowing exit of an animal from the container, the base defining a litter return window;
    a plurality of stair steps defining an inclined pathway extending from the opening, adjacent pairs of stair steps each defining a slot therebetween for passage therethrough of the litter tracked by the animal when the animal travels along the pathway after exiting the container through the opening; and
    a litter return slide disposed beneath the plurality of stair steps and configured to catch the tracked litter passing through each slot therein, the litter return slide having a first end in communication with the litter return window and being downwardly sloped to the first end for slidably returning the tracked litter through the litter return window and back into the container automatically for use by the animal.

13. The litter box of claim 12, further including a pair of oppositely disposed barriers coupled to the pathway for encouraging the animal to travel the pathway in its entirety before departing therefrom.

14. The litter box of claim 12, wherein the pathway includes a rubberized grate for enhancing comfort of the animal while the animal travels along the pathway and across the grate.

15. The litter box of claim 14, wherein the grate is removable from the pathway.

16. The litter box of claim 12, further including a rubberized brush coupled to the cover and cooperative with the opening defined by the cover such that the animal must rub against the brush while the animal exits the opening.

17. The litter box of claim 12, further including a support structure coupled to the plurality of stair steps for supporting and elevating the plurality of stair steps above the litter return slide, wherein the support structure includes a bottom wall and at least one vertical wall coupled to the bottom wall to substantially surround the litter return slide, the litter return slide having a second end coupled to the at least one vertical wall, the first end of the litter return slide in communication with the litter return window through an at least partially open end of the support structure.

18. The litter box of claim 17, wherein the bottom wall, the at least one vertical wall and the litter return slide together define a storage compartment therebetween, the support structure including an access door in the at least one vertical wall for allowing access to the compartment.

19. The litter box of claim 17 wherein each of plurality of steps are individually removably supported by the support structure.

20. The litter box of claim 12, further including an obstruction removably coupled to the container and disposed at the opening for slowing exit of the animal through the opening.

* * * * *